United States Patent [19]

Yomoda

[11] Patent Number: 5,703,730
[45] Date of Patent: Dec. 30, 1997

[54] LENS DRIVE APPARATUS

[75] Inventor: Kenju Yomoda, Urawasi, Japan

[73] Assignee: Samsung Electronics Co., Ltd., Kyungki-do, Rep. of Korea

[21] Appl. No.: 431,737

[22] Filed: May 1, 1995

(Under 37 CFR 1.47)

[30] Foreign Application Priority Data

Apr. 30, 1994 [KR] Rep. of Korea ............... 94-9537

[51] Int. Cl.⁶ .................................... G02B 7/02
[52] U.S. Cl. ............... 359/824; 359/822; 359/814; 369/44.15; 369/256; 250/201.5
[58] Field of Search ................ 359/813, 822, 359/824, 814; 369/256, 44.15, 44.14; 250/201.5

[56] References Cited

U.S. PATENT DOCUMENTS

| | | | |
|---|---|---|---|
| 4,646,283 | 2/1987 | Ito et al. | 369/256 |
| 4,679,903 | 7/1987 | Kasahara et al. | 359/824 |
| 4,906,831 | 3/1990 | Yomoda et al. | 250/201.5 |
| 5,208,703 | 5/1993 | Ikegame et al. | 359/813 |

*Primary Examiner*—Loha Ben
*Attorney, Agent, or Firm*—Sughrue, Mion, Zinn, Macpeak & Seas, PLLC

[57] ABSTRACT

A lens drive apparatus for driving vertically and horizontally a lens component by employing magnets and coils, includes a lens component, a lens support member, a mass balancing member for balancing with respect to the lens support member, and a seesaw support member for supporting the lens support member and the mass balancing member to perform a seesaw action. The lens drive apparatus can be miniaturized and made lightweight and operates stably as a balanced lens component and serves as an efficient actuator for a focusing/tracking servo with respect to an objective lens of an optical pickup for recording and reproducing optical information.

14 Claims, 5 Drawing Sheets

LENS DRIVE APPARATUS

BACKGROUND OF THE INVENTION

1. Field of the Invention

The present invention relates to a lens drive apparatus for driving vertically and horizontally a lens component used for various kinds of optical devices, and more particularly, to a lens drive apparatus that can be used as a tracking and focusing servo of the objective lens in a recording/reproducing optical pickup.

2. Description of the Related Art

In general, a recording/reproducing optical pickup focuses light generated from a light source onto an optical recording medium by employing an objective lens, and receives the light reflected from the optical recording medium by using an optical detector to detect an electrical signal in a known manner. For such a recording/reproducing optical pickup for use in an optical disc player, the entire optical pickup is positioned over the desired (target) track of the optical disc by a coarse seek actuator, for example, a voice coil motor, to be moved quickly in a perpendicular direction. In addition, in order to form an optical spot in the center of a target track, the objective lens of the optical pickup is installed such that the lens can be moved vertically (towards and away from the disc) and horizontally (along the disc surface) in minute increments by a fine seek actuator in accordance with vibrations of the optical disc (refer to U.S. Pat. Nos. 4,761,773 and 4,837,757).

For high speed data seeking, an optical pickup requires rapid response characteristics for the coarse seek and fine seek actuators. Specifically, the fine seek actuator should contribute to the response characteristic of the coarse seek actuator. In addition, for system miniaturization, the fine seek actuator should be lightweight and as small as possible.

As an example of the fine seek actuator for driving an objective lens of an optical pickup, U.S. Pat. No. 4,646,283 discloses an objective lens drive apparatus for an optical disc player. The apparatus comprises a base, an objective lens holder, a coil, a magnet, a yoke and four resilient wire members. The objective lens holder is supported on the base by the four resilient wire members so that the lens can be moved up and down and to the right and left. The coil is attached to the objective lens holder, and the magnet and yoke are installed in the base. That is, the coil moves together with the objective lens holder via an electromagnetic force provided by the coil and magnet when a current is applied to the coil.

In such a structure, the size of the objective lens holder has to be large enough to hold the coil. In addition, since the total weight of the objective lens holder, the coil attached thereto, and the objective lens loaded thereon acts as a load on the fine seek actuator, the actuator must be designed to have very high torque capability. This greatly restricts the ability to manufacture a device which is lightweight and small.

Meanwhile, the objective lens holder is supported by the four resilient wire members. Therefore, when the lens moves vertically, the lens tilts toward the base, and thus, the incident and reflected light axes deviate from each other. This light axis deviation is inevitable and is recognized by the photo detector as an error, which makes for an unstable optical pickup operation due to frequent servo errors.

The inventor of the present invention has therefore devised an apparatus which can be driven with relatively low driving torque and has an objective lens which does not tilt (see U.S. Pat. No. 4,906,831).

SUMMARY OF THE INVENTION

Accordingly, it is an object of the present invention to provide a lens drive apparatus having a rapid response characteristic for high speed seeking operations.

It is another object of the present invention to provide a lens drive apparatus which is lightweight, to further enhance high speed seeking.

It is yet another object of the present invention to provide a lens drive apparatus which is miniaturized.

It is still another object of the present invention to provide a lens drive apparatus whose lens component is driven in a correct posture (not tilted), so that the lens can be operated without servo error.

To accomplish the above objects of the present invention, there is provided a lens drive apparatus for driving a lens component vertically and horizontally, the lens drive apparatus comprising: a housing; at least one magnet member for generating a magnetic flux; a coil member installed in the housing for generating an electromagnetic force by interlinking with the magnetic flux of the magnet member; a lens support member in which the lens component and at least one magnet member are installed; a mass balancing member for providing with respect to the lens support member; and a seesaw support member for supporting the lens support member and the mass balancing member on the housing, so that the lens support member and the mass balancing member move together in a seesaw action whereby the mass balancing member acts as a counterweight for the lens support member.

According to the present invention, the lens support member and the mass balancing member are supported for the seesaw action to be moveable by a small torque as compared with their total weight. In addition, the magnet member, being lighter and smaller than the coil, moves. Thus, the size and weight of the moving portion, i.e., that which moves with the lens component, can be reduced. As a result, the device can be small and lightweight. In addition, it is possible to balance the lens support member with respect to its vertical movement, via a device for supporting the lens support member and the mass balancing member.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE PREFERRED EMBODIMENT

The present invention will be explained in more detail through a preferred embodiment with reference to the attached drawings.

Figure 1:
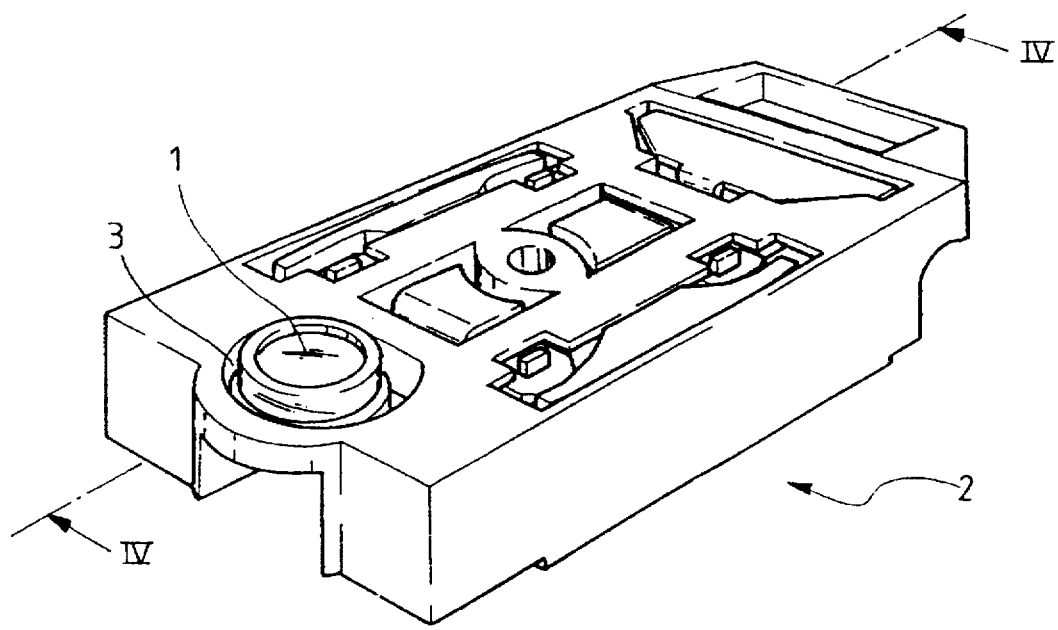
FIG. 1 is a perspective view of a lens drive apparatus of a preferred embodiment of the present invention.
Figure 2:
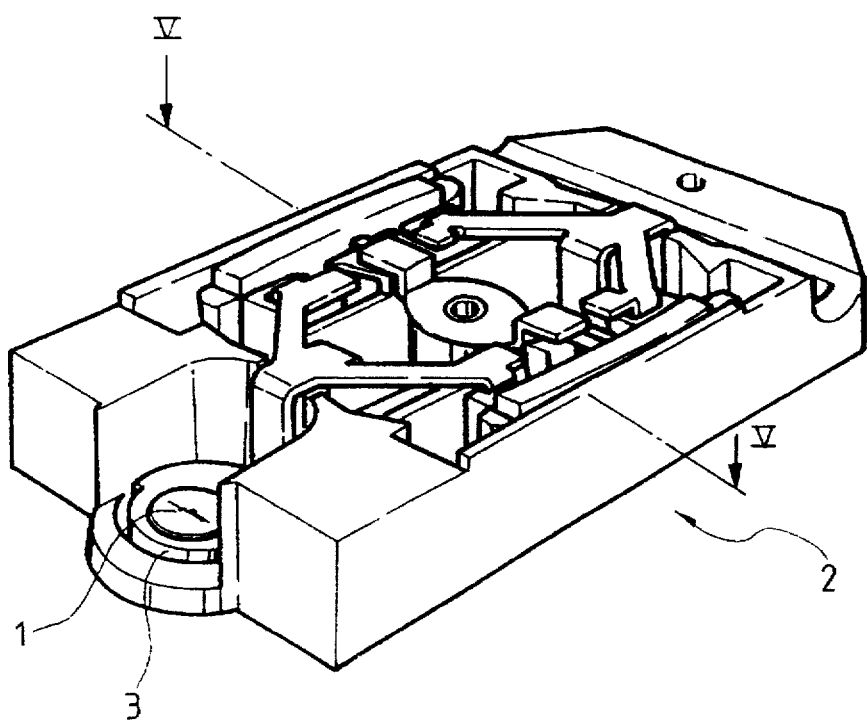
FIG. 2 is a perspective view showing the other side of the lens drive apparatus of FIG. 1.

Referring to FIG. 1 and FIG. 2, reference numeral 1 is a lens component, for example, an objective lens of a recording/reproducing optical pickup (not shown). Lens component 1 is contained in an aperture 3 formed in one side of a housing 2 and is movable in a limited region up and down and horizontally in the figure. A known optical pickup body is installed under housing 2, and lens component 1 focuses light emitted from the pickup body to form an optical spot onto an optical recording medium (not shown), for example, an optical disc to reproduce information in a known manner.

Figure 3:
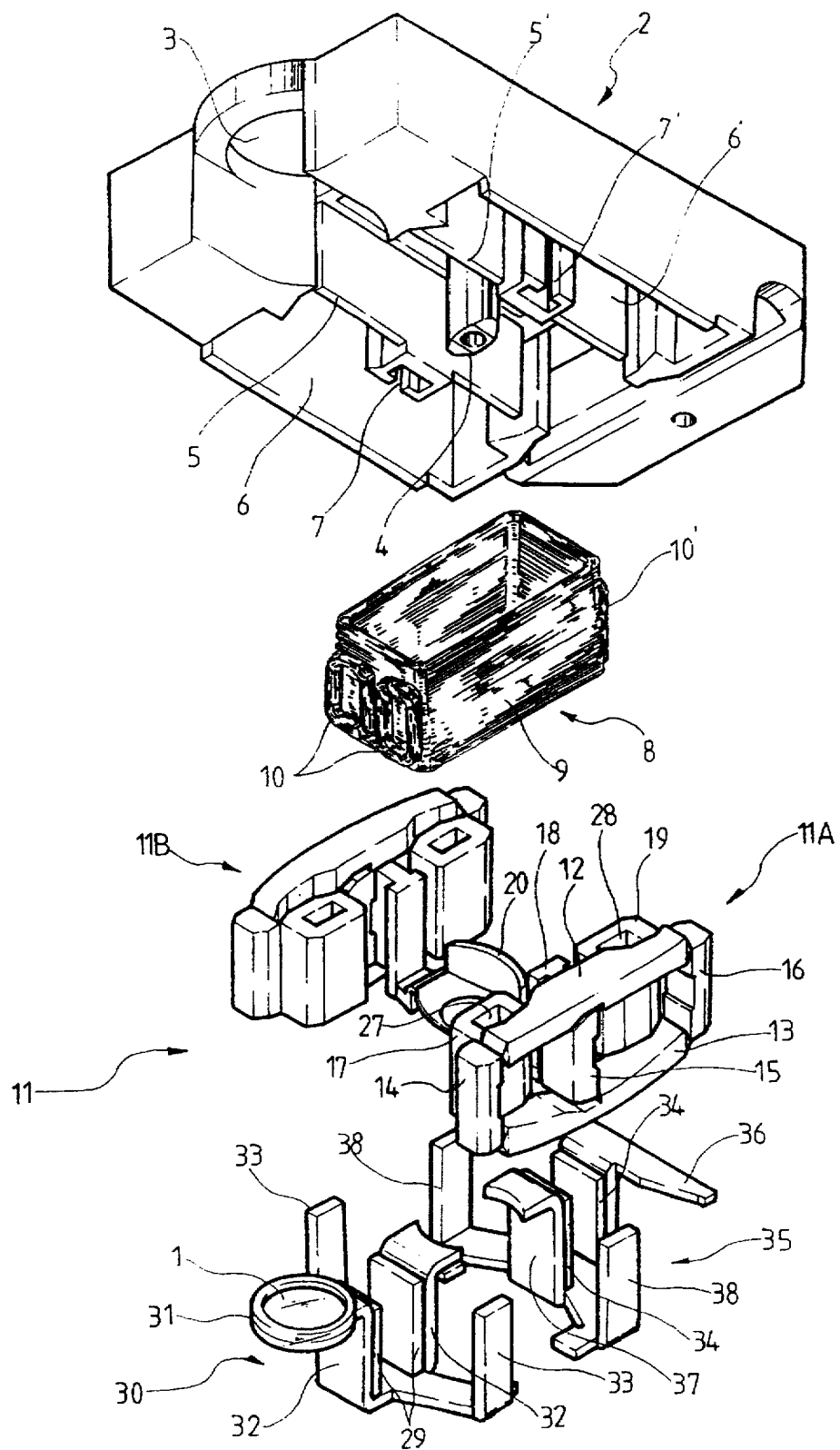
FIG. 3 is an exploded perspective view of the lens drive apparatus of FIG. 1.

Referring to FIG. 3, housing 22 includes aperture 3 formed in the front portion thereof, a threaded projection 4 protruding from the center of the bottom surface, coil supports 5 and 5' formed on the respective sides of threaded projection 4, space portions 6 and 6' provided between the respective sides and coil supports 5 and 5', and fixed slots 7 and 7' formed in coil supports 5 and 5'.

Coil member 8 is composed of a focusing drive element 9 wherein a fine coil is wound and shaped as a square pillar and two pairs of tracking drive elements 10 and 10' which are wound as a loop and disposed on focusing drive element 9. Tracking drive elements 10 and 10' are respectively attached onto the front and rear of focusing drive element 9. The right and left sides of focusing drive element 9 are attached to coil supports 5 and 5' of housing 2 so that focusing drive element 9 can be fixedly installed into housing 2 (see FIG. 5).

A seesaw support 11, is received in space portions 6 and 6' of housing 2. Seesaw support 11 consists of a symmetrical pair of elements 11A and 11B which are disposed in space portions 6 and 6', respectively. Elements 11A and lib each include two horizontal members 12 and 13 in upper and lower portions, three vertical members 14, 15 and 16 respectively coupled to the front end, rear end and the center portion of horizontal members 12 and 13, three block members 17, 18 and 19 coupled to the side of each vertical member 14, 15 and 16. A connector 20 for connecting the lower portions of block members 18 is located in the middle of each element 11A and 11B. Block member 18 is fixedly inserted into fixing slots 7 and 7' of housing 2 (see FIG. 5), connector 20 is located on an end portion of screw boss 4 of housing 2 (see FIG. 4) and is fastened by a screw (not shown).

Figure 5:
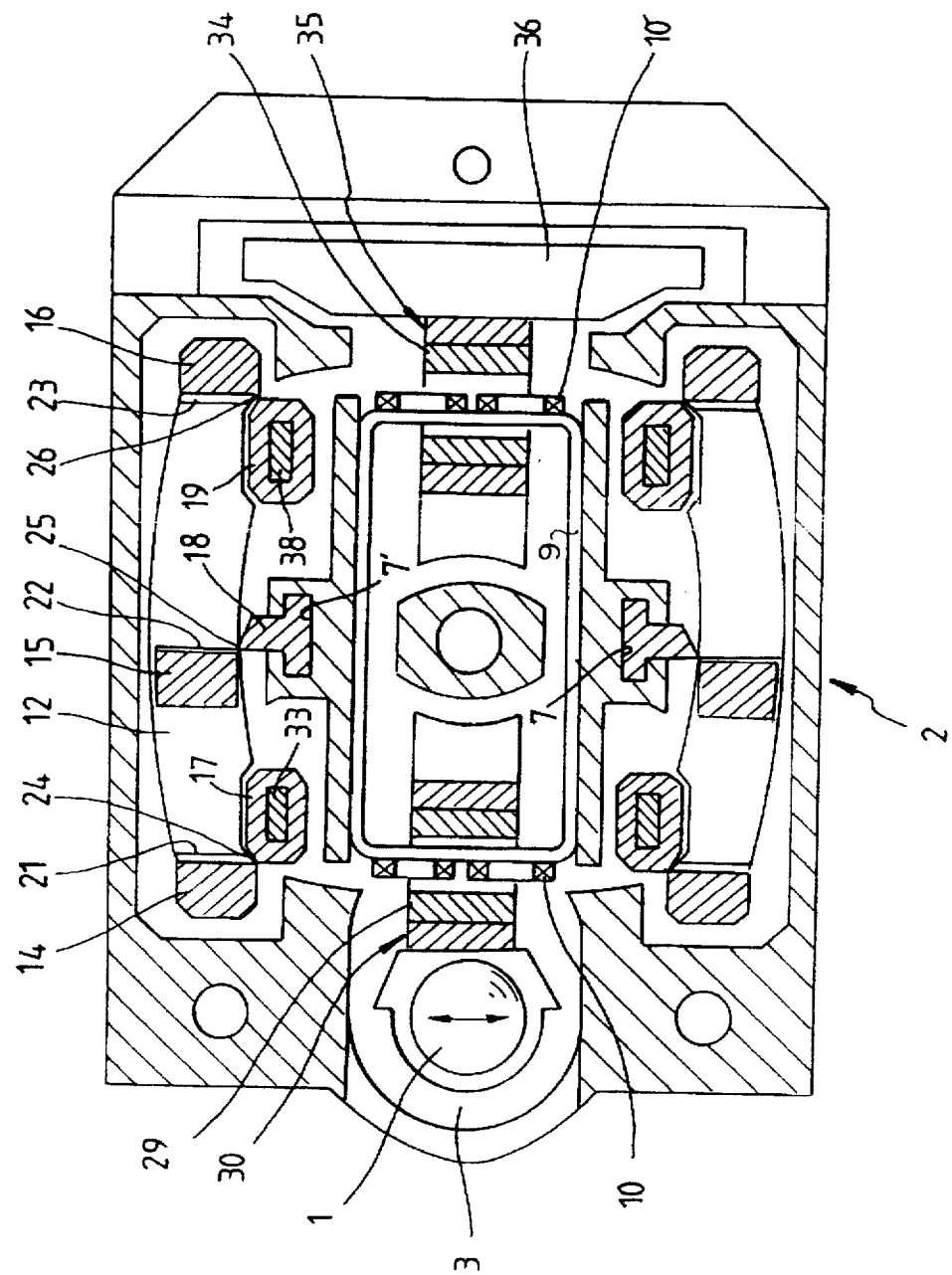
FIG. 5 is a cross-sectional view taken along line V—V of FIG. 2.
Figure 6A:
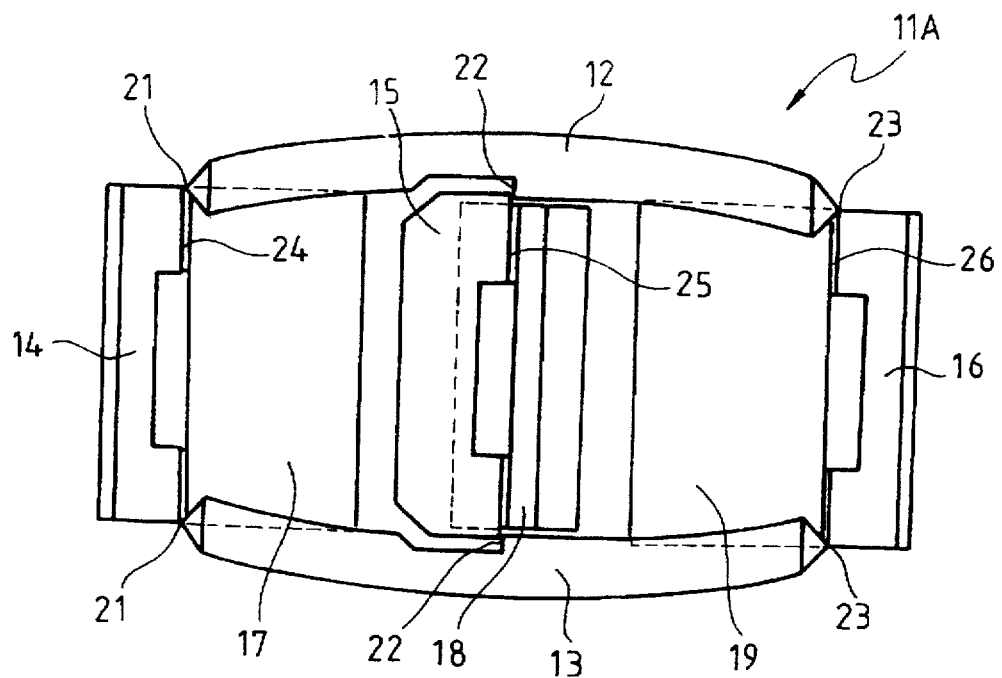
FIG. 6A is a side view of the seesaw support shown in FIG. 3.

Edges of upper and lower surfaces of horizontal members 12 and 13 and vertical members 14, 15 and 16 are connected to each other by means of hinges 21, 22 and 23 (see FIG. 5 and FIG. 6A). In addition, each edge of vertical members 14, 15 and 16 and block members 17, 18 and 19 are connected by hinges 24, 25 and 26 as shown in FIG. 5. Hinges 21, 22 and 23 have axes which extend horizontally to allow movement in a vertical plane between horizontal members 12, 13 and vertical members 14, 15 and 16, but to prohibit such movement in a horizontal plane. On the other hand, hinges 24, 25 and 26 have axes which extend vertically to allow movement in a horizontal plane between vertical members 14, 15 and 16 and block members 17, 18 and 19, but prohibit such movement in a vertical plane. Meanwhile, among block members 17, 18 and 19 of elements 11A and 11B, the two block members 17 and 19 which are located in the front and rear, respectively, have hollow portions 27 and 28 which respectively are coupled to lens support member 30 and to mass balancing member 35. Seesaw support 11 allows lens support member 30 and mass balancing member 35 to move relative to one another in a seesaw motion. "Seesaw motion" referred to herein means a pivoting motion about a centralized fulcrum.

Referring to FIG. 3, lens support member 30 includes lens support 31 on which lens component 1 is supported, a pair of magnet supports 32 on which a pair of magnet members 29 are attached in opposition to one another, a pair of coupling portions 33 which are inserted in hollow portion 27 of block member 17. Mass balancing member 35 is approximately symmetrical to lens support member 30, and includes a mass plumb 36, a pair of vertical magnet supports 37 on which a pair of opposing magnet members 34 are attached, and coupling portions 38 each inserted in hollow portion 28 of block member 19. The front and rear of coil member 8 of housing 2 are respectively inserted between magnet members 29 of lens support member 30 and between magnet members 34 of mass balancing 35 (see FIG. 4 and FIG. 5).

The thus-structure lens drive apparatus operates as follows.

Figure 4:
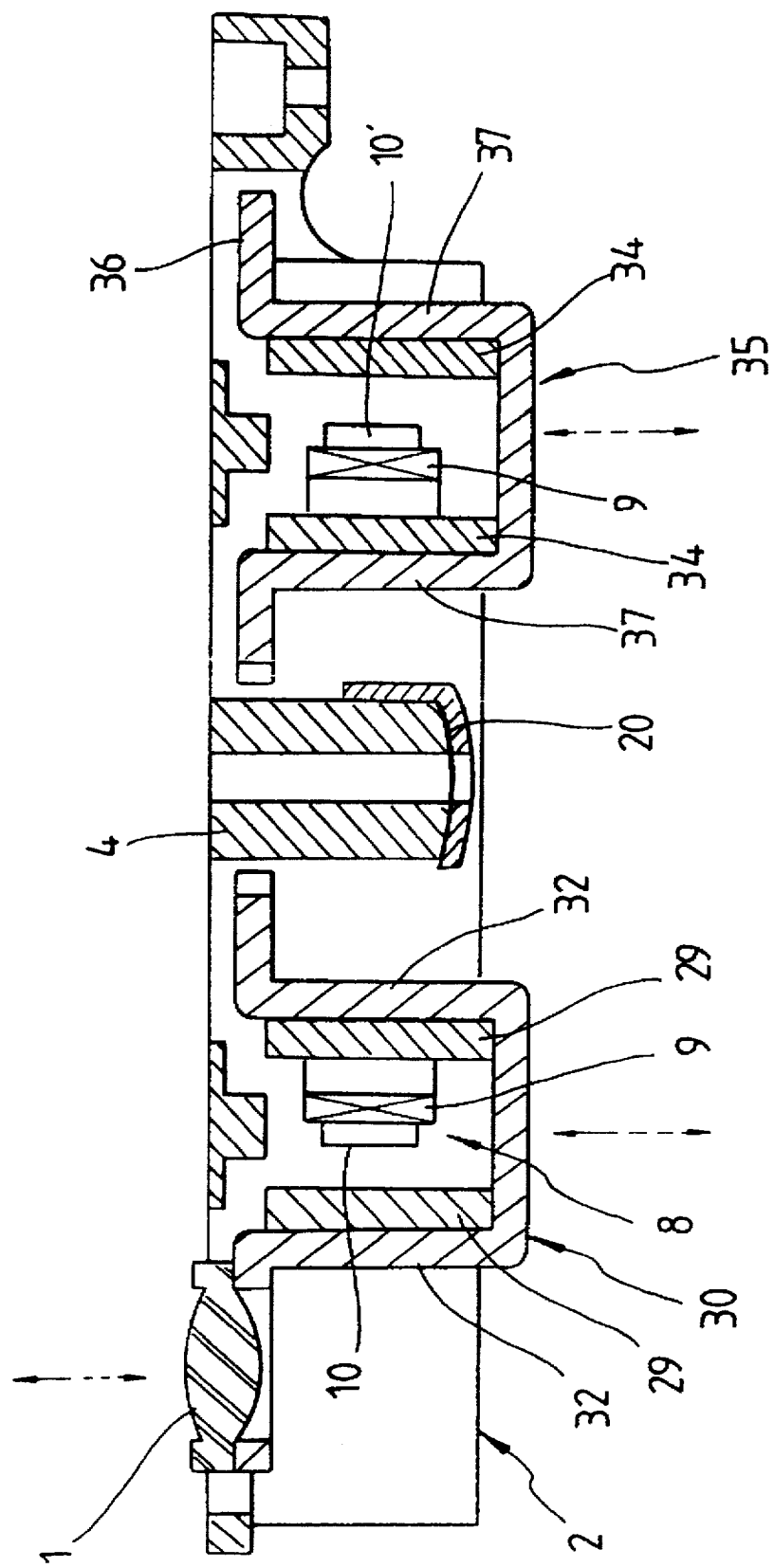
FIG. 4 is an elevational sectional view, taken along line IV—IV of FIG. 1.
Figure 6B:
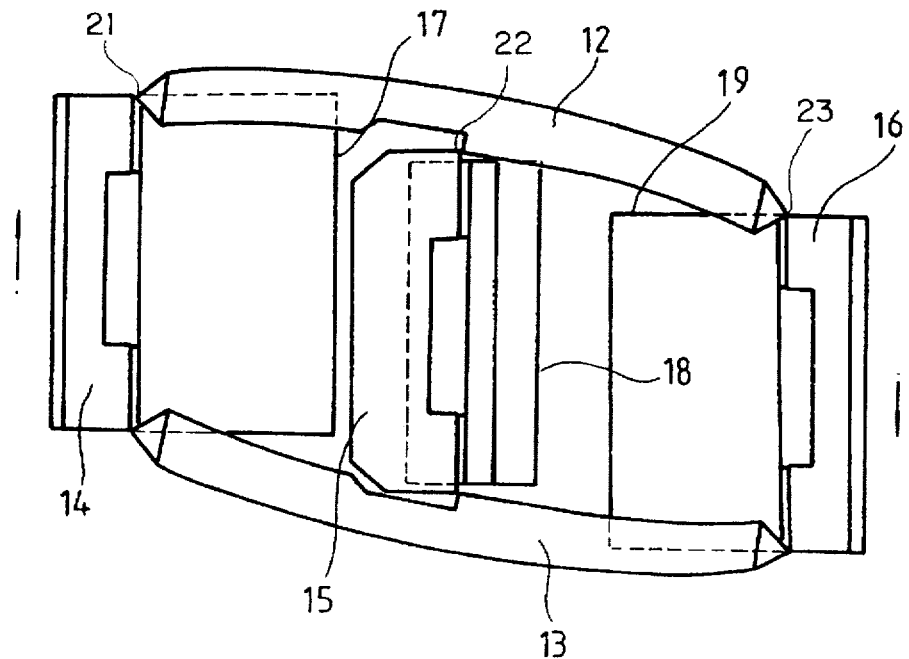
FIG. 6B is a side view illustrating movement during a focusing operation of the seesaw support shown in FIG. 6A.

Referring to FIG. 4, when current is applied to focusing drive element 9 of coil member 8, an electromagnetic force is generated (based on Fleming's left-hand rule) according to the direction of the current and the direction of the magnetic flux between magnet member pair 29 and magnet member pair 34. Since coil member 8 is attached fixedly to housing 2, magnet member pair 29 and magnet member pair 34 are biased to move vertically together with the respective lens support member 30 and mass balancing member 35, by the electromagnetic force, and as shown in FIG. 6A and FIG. 6B, hinges 21, 22 and 23 of seesaw support 11 permit the vertical movement. At this time, the directions of the currents that flow in both sides of focusing drive element 9 are opposite to one another. Therefore, magnet member pair 29 and magnet member pair 34 move in opposite directions. Accordingly, lens component 1 supported by lens support member 30 moves up or down. When lens component 1 moves vertically, since block member 18 connected to vertical member 15 which is located in the center of seesaw support 11 is fixed to housing 2 (see FIG. 5), and hinge 25 for connecting vertical member 15 and block member 18 restricts the vertical movement, none of the three vertical members 14, 15 and 16 incline so that they all move in a balanced vertical state while upper and lower horizontal members 12 and 13 are inclined, as shown in FIG. 6B. In addition, block members 17, 18 and 19 connected respectively to vertical members 14, 15 and 16 maintain the vertical state, and lens support member 30 and mass balancing members 35 which are respectively coupled to block members 17 and 19 are not inclined and move in a vertical plane, albeit in opposing directions (see FIG. 6B). Accordingly, lens component 1 supported by lens support member 30 does not become inclined upon the vertical movement and is thus moved vertically in a balanced state.

Referring to FIG. 5, when a current is applied to tracking drive elements 10 and 10', an electromagnetic force is generated based on Fleming's left-hand law. In this case, magnet member pair 29 and magnet member pair 34 biased to move horizontally and in opposite directions, together with the respective lens support member 30 and mass balancing member 35. In addition, the horizontal movement is permitted by hinges 24, 25 and 26 respectively connecting vertical members 14, 15 and 16 with block members 17, 18 and 19 (see FIG. 5). Thus, movement of lens component 1 in a horizontal plane is possible.

In driving lens component 1 vertically and horizontally, lens support member 30 and mass balancing member 35 are in a balanced mass, and at the same time, are supported by seesaw support 11 so that the seesaw is performed. Therefore, the required drive torque for moving lens component 1 is relatively low. Either of magnet member pairs 29 and 34 of mass balancing member 35 and lens support member 30 is enough to drive lens component 1, and thus only one magnet member 29 and one magnet member 34 can be used to drive lens component 1.

As described above, the present invention comprises seesaw support 11 for supporting lens support member 30 and mass balancing member 35 so that the two can be in a balanced state and rock back and forth in a seesaw manner. Thus, a lens drive apparatus can be provided which can be driven by a small torque, meaning that the response characteristic is greatly improved, and can be operated in a stable manner without servo error by preventing lens component 1 from being inclined by employing seesaw support 11 having a suitable structure. In addition, in the present invention coil members 8, 9, 10 and 10' are fixed and magnet members 29 and 34, which are lighter and smaller than the coil members, are moveable. Thus, a lens drive apparatus which is small, lightweight and ultra-slim can be provided.

The present invention allows high speed data search operations, for example, in the case of a recording/reproducing optical pickup, and enables a highly reliable recording/reproducing system to be constructed.

The invention has been described through a preference embodiment. However, various modifications can be made without departing from the scope of the invention as defined by the appended claims. For example the hinge members may be any type of connector that allows the disclosed movement.

What is claimed is:

1. A lens drive apparatus for driving a lens component vertically and horizontally, said lens drive apparatus comprising:

a housing;

at least one magnet member for generating a magnetic flux;

a coil member installed fixedly on said housing and for generating an electromagnetic force by interlinking with the magnetic flux of said magnet member;

a lens support member, said lens component and one of said at least one magnet member being disposed on said lens support member;

a mass balancing member for balancing said lens support member; and seesaw support means for coupling said lens support member and said mass balancing member to said housing, so that said lens support member and the mass balancing member can move in an opposing seesaw manner.

2. A lens drive apparatus according to claim 1, wherein said housing has an aperture, said lens component being received in said aperture.

3. A lens drive apparatus according to claim 1, wherein said housing comprises a coil support, said coil member is attached to said coil support.

4. A lens drive apparatus according to claim 1, wherein said housing has a space defined therein, said seesaw support means being received in said space.

5. A lens drive apparatus according to claim 1, wherein another of said at least one magnet member is disposed on said mass balancing member, and said mass balancing member is driven by said electromagnetic force together with the said another of said at least one magnet member.

6. A lens drive apparatus according to claim 1, wherein said seesaw support means includes two horizontal members opposing each other at respective upper and lower portions thereof, three vertical members extending between said horizontal members, said vertical members being respectively connected to both ends and the center of each horizontal member, three block members connected to a side of at least one of said vertical members, a first hinge group connecting each horizontal member with each vertical member, and a second hinge group connecting at least one of said vertical members with each block member.

7. A lens drive apparatus according to claim 1, wherein said seesaw support means comprises a symmetrical pair of elements, said elements each including two horizontal members opposing each other at respective upper and lower portions thereof, three vertical members extending between said horizontal members, said vertical members being respectively connected to both ends and the center of each horizontal member, three block members connected to a side of at least one of said vertical members, a first hinge group connecting each horizontal member with each vertical member, and a second hinge group connecting at least one of said vertical members with each block member.

8. A lens drive apparatus according to claim 7, wherein said seesaw support means further comprises a connecting portion for connecting said symmetrical pair of elements.

9. A lens drive apparatus according to claim 8, wherein a middle one of said block members, which is in the middle of said seesaw support means, is fixedly disposed on said connecting portion.

10. A lens drive apparatus according to either claim 6 or 7, wherein said first hinge group is hinges provided on upper and lower edges of each of said vertical members.

11. A lens drive apparatus according to either claim 6 or 7, wherein said second hinge group is hinges provided on edges of said at least one of said vertical members and said block member.

12. A lens drive apparatus according to either claim 6 or 7, wherein said first hinge group permits movement in a vertical plane and restricts movement in a horizontal plane.

13. A lens drive apparatus according to either claim 6 or 7, wherein said second hinge group permits movement in a horizontal plane and restricts movement in a vertical plane.

14. A lens drive apparatus according to either claim 6 or 7, wherein hollow portions are formed respectively in two of said block members which are located on either side of said middle one of said three block members of said seesaw support means, a portion of said lens support member and portion of said mass balancing member being received in respective ones of said hollow portions.

* * * * *